United States Patent [19]

McDowell, deceased

[11] Patent Number: 4,473,246
[45] Date of Patent: Sep. 25, 1984

[54] PIPE COUPLING

[75] Inventor: George E. McDowell, deceased, late of Ypsilanti, Mich., by Inez R. McDowell, administratrix

[73] Assignee: Michigan Tube Benders, Ypsilanti, Mich.

[21] Appl. No.: 319,006

[22] Filed: Nov. 6, 1981

[51] Int. Cl.³ .............................................. F16L 17/04
[52] U.S. Cl. ..................................... 285/373; 285/330
[58] Field of Search ............... 285/373, 419, 367, 410, 285/253, 330; 24/279

[56] References Cited
U.S. PATENT DOCUMENTS

| | | | |
|---|---|---|---|
| 812,162 | 2/1906 | Bemis . | |
| 2,227,551 | 1/1941 | Morris . | |
| 2,778,661 | 1/1957 | Leighton | 285/373 X |
| 3,527,484 | 9/1970 | Walkden . | |
| 3,834,744 | 9/1974 | Masatchi . | |
| 4,142,743 | 3/1979 | McGowen | 285/373 X |
| 4,165,109 | 8/1979 | Foti . | |
| 4,312,526 | 1/1982 | Cassel | 285/419 |

Primary Examiner—Dave W. Arola
Attorney, Agent, or Firm—Beaman & Beaman

[57] ABSTRACT

An extruded metal pipe coupling for coupling end-to-end aligned pipes comprises a main body forming a coupling band terminating in opposed connecting flanges directed radially outwardly of the main body. Fasteneras pass through apertures in the connecting flanges and are tightened to draw the connecting flanges together. The free edges of the connecting flanges have abutment surfaces which abut each other upon tightening of the fasteners to provide a fulcrum about which continued tightening is effective to impart increased tensioning to the main body. The abutment surfaces roll or slide with respect to one another. The coupling is useful in conjunction with other elements for imparting leak resistance to the coupling joint.

11 Claims, 5 Drawing Figures

PIPE COUPLING

BACKGROUND AND SUMMARY OF THE INVENTION

The present invention relates to pipe couplings and is specifically concerned with a new and improved coupling providing improved circumferential tensioning capability and better clamping action.

One well known type of pipe coupling for coupling end-to-end aligned pipes comprises a main body having a generally circular cross sectional shape which extends almost a full 360° and terminates in opposed connecting flanges which are directed generally radially outwardly from the main body. Aligned apertures are provided in the connecting flanges for fastening means such as nuts and bolts. As the nuts and bolts are tightened to draw the connecting flanges together the resultant action impairs circumferential contraction to and tensioning of the main body thereby in turn creating radially inwardly directed clamping forces on the two pipe sections around the coupling.

In many applications a sufficiently tight coupling of the two pipes can be accomplished without a great deal of tightening. However, there are other situations where substantial circumferential tensioning forces are required. For example, where pipes are carrying fluids it may be important to have a tight, leak-resistant seal at the coupling. In the case of larger diameter pipes this means that relatively large tightening forces must be applied to the connecting flanges in order to attempt to impart the desired circumferential tension to the body of the coupling. Where these more demanding requirements are imposed, conventional pipe couplings may reach a point where the coupling begins to yield in such a way that increased tightening of the fastening means tends to tip one of the connecting flanges toward the other rather than imparting increased circumferential tension to the coupling body. In such a case increased tightening may even distort the coupling to a point where it is not suitable for use. Hence, where leakage of fluid passing through the coupled pipes is undesirable, conventional couplings may not be satisfactory. This means that additional measures must be taken in order to render the couplings effective and leak-resistant. Obviously these measures will involve additional complications and are generally wasteful of time, labor, materials, and money.

The present invention is directed to a new and improved pipe coupling having improved tensioning capability and which is well-suited for use in situations where tight coupling is specified. The present invention provides a pipe coupling which not only can be readily fabricated and installed but also can impart the required circumferential tension to render a coupling joint leak-resistant. The pipe coupling of the invention includes novel structural features associated with the connecting flanges whereby the fastening means may be tightened and the yielding which otherwise occurs is counteracted. In this way very substantial circumferential tension can be imparted to the coupling to achieve clamp forces capable of imparting a leak resistant character to a coupling joint even where the pipes are of larger diameter, for example four-inch pipes. The invention further possesses the advantage of requiring a small number of component parts and can be conveniently fabricated using standard manufacturing techniques.

The invention, in its presently preferred embodiment, comprises an extruded metal coupling having a generally circular main body which forms the coupling band and which extends almost a full 360° around the axis of the coupling, terminating in opposed, generally radially directed, connecting flanges. Aligned apertures are provided in the connecting flanges and a headed bolt is passed through the aligned apertures, and a nut is run into the threaded shank of the bolt. Tightening of the nut and bolt is effective to draw the connecting flanges toward each other and thereby impart circumferential tension to the main body. Disposed radially outwardly of the connecting flanges are opposed abutment surfaces on the connecting flanges which are adapted to abut each other as the nut and bolt are increasingly tightened. When the two abutment surfaces abut each other, they form a fulcrum point about which continued tightening of the nut and bolt is effective to impart substantially increased circumferential tension to the coupling over that which existing prior to the abutment of the abutment surfaces.

In the preferred embodiment one abutment surface has a semi-circular shape as viewed axially of the coupling and the opposite abutment surface has a flat, planar shape. When they abut each other, the fulcruming action allows the semi-circular surface to roll on the flat surface and in this way the interaction between the abutment surfaces does not impair the effective tensioning of the coupling but rather promotes a much more effective tensioning than attainable with other couplings. The coupling is readily manufactured as an extruded metal, (aluminum, for example) so that the body of the coupling, the connecting flanges, and the abutment surfaces are all integral parts of a single piece. The extrusion may be cut to any desired length and the apertures drilled in the connecting flanges. Hence an economical construction is provided, yet one which may be readily installed and tightened without a complicated installation procedure.

Although the pipe coupling of the invention is well-suited to any application where pipes are to be coupled, it is particularly adapted for coupling larger diameter pipes, for example four inch pipes, where a leak-resistant joint is specified. For this purpose, additional sleeve elements may be disposed within the pipe coupling to impart a leak resistant characteristic to the joint. In the preferred embodiment these additional sleeve elements include a first metal sleeve element disposed within the main body of the coupling, an elastomeric sleeve element disposed within the first metal sleeve element, and a second metal sleeve element disposed within the elastomeric sleeve element. The second metal sleeve element is disposed in a central region of the coupling and overlaps both ends of the coupled pipes. The first metal sleeve element, the elastomeric sleeve element, and the main body of the pipe coupling extend axially in both directions beyond the axial ends of the second metal sleeve element so that when the coupling is installed and tightened the second metal sleeve provides a protection to the elastomeric sleeve element while the elastomeric sleeve element provides leak resistance for the joint.

In connection with the present invention a search was conducted in the U.S. Patent and Trademark Office which developed the following U.S. Pat. Nos.: 812,162; 2,227,551; 3,527,484; 3,834,744; 4,142,743; and 4,165,109. None of these patents discloses however the novel aspects of the present invention.

DESCRIPTION OF THE PREFERRED EMBODIMENT

Figure 1:
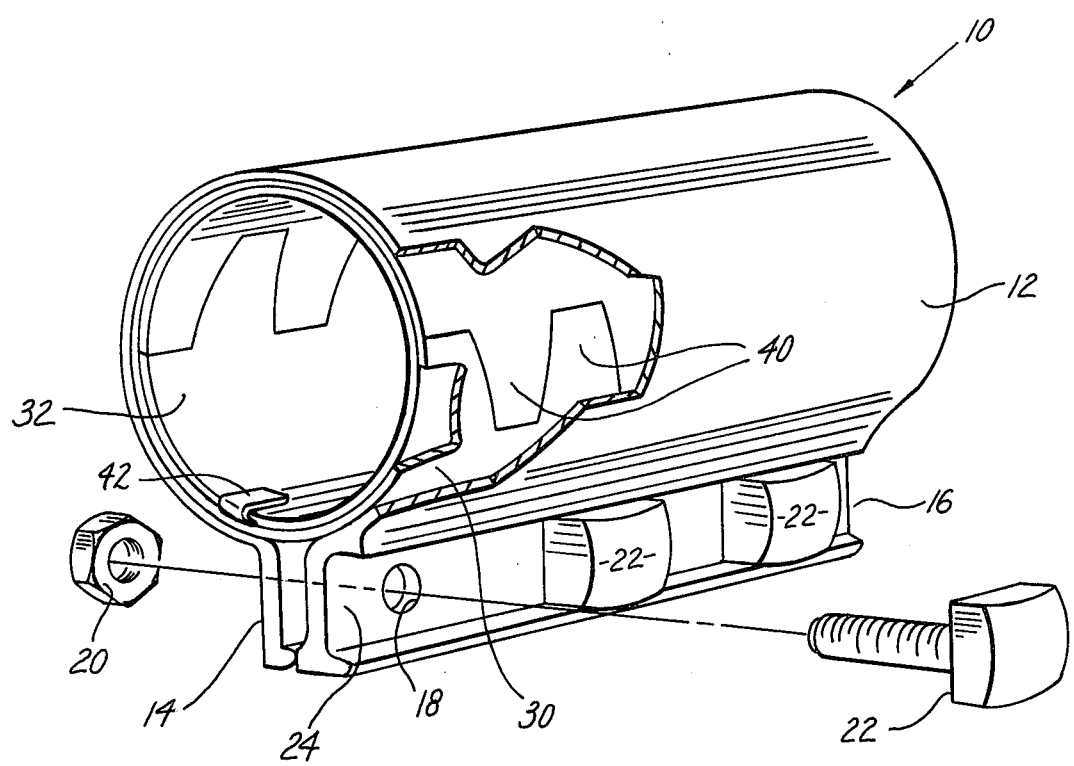
FIG. 1 is a perspective view of a pipe coupling embodying principles of the present invention.

FIG. 1 illustrates a pipe coupling 10 of the present invention. The pipe coupling 10 comprises a main body 12 which is of a generally circular cross section and extending circumferentially slightly less than a full 360° to terminate in a pair of opposed connecting flanges 14 and 16. The connecting flanges 14 and 16 are directed generally radially outwardly and are coextensive in length with the main body 12. Apertures 18 are provided at desired locations along the length of flange 16 as are corresponding aligned apertures 18 in flanges 14. Fastening means are associated with each pair of aligned apertures for tightening the coupling when the coupling is put to use in joining two sections of pipes together. In order to fasten the connecting flanges together a nut 20 and bolt 22 are used at each fastening location. The bolt 22 is positioned as shown so that the shank of the bolt passes through the aligned apertures 18 in the two connecting flanges and the nut 20 is threaded onto the protruding shank of the bolt. The head of the bolt fits within a rectangular recess 24 which is fashioned in the connecting flange 16. The vertical dimension of the recess as viewed in FIG. 1 corresponds to the dimension across two sides of the rectangular headed bolt. The outside of flange 14 against which nut 20 is disposed is substantially flat so as to allow convenient access for a tool to engage the nut for tightening purposes. In this way each fastening procedure involves the use of only a single tool such as a wrench and it is unnecessary for a second tool to engage the head of the bolt 22.

Figure 3:
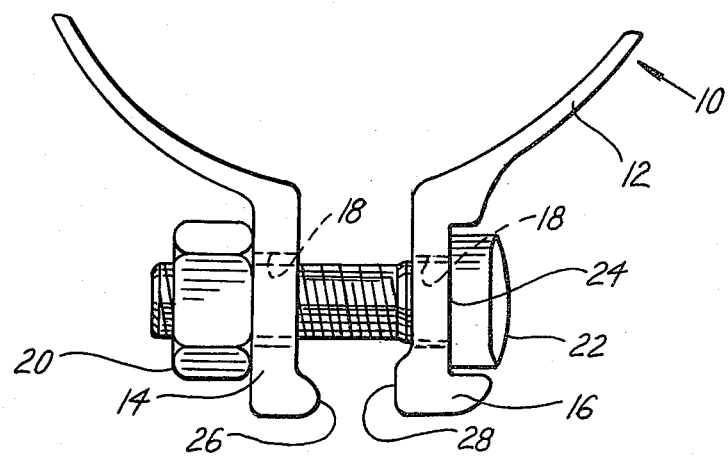
FIG. 3 is a fragmentary axial view of the coupling (by itself) illustrating its condition upon initial tightening.
Figure 4:
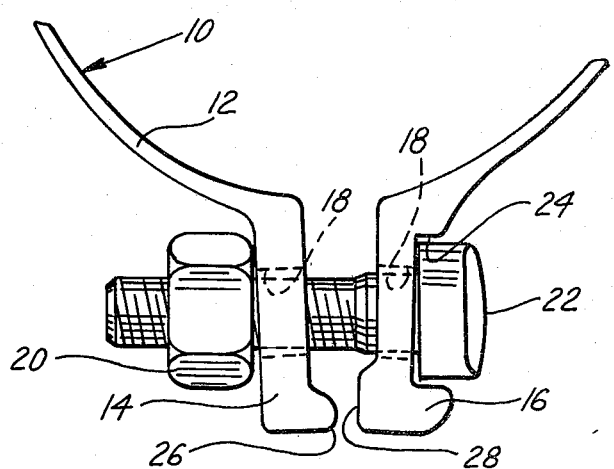
FIG. 4 is a view similar to FIG. 3 showing the condition upon further tightening.
Figure 5:
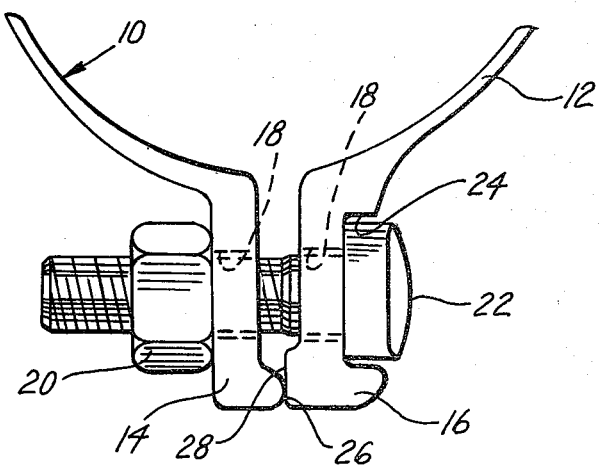
FIG. 5 is a view similar to FIGS. 3 and 4 showing a more fully tightened condition.

Further details of the connecting flanges 14 and 16 can be seen in FIGS. 3, 4, and 5. The two connecting flanges further include opposed abutment surfaces which extends lengthwise of the respective flanges adjacent the free outer edges of the flanges. In this case of flange 14 the abutment surface is designated by the reference numeral 26 and in the case of connecting flange 16 the abutment surface is designated by the reference numeral 28. Abutment surface 26 is formed as a protuberance extending along the length of the connecting flange and having semi-circular contour. Abutment surface 28 is a flat, planar surface which extends axially of the connecting flange.

As each nut and bolt is tightened, the main body 12 is circumferentially contracted and increased circumferential tension is imparted to it by virtue of the forces exerted on the connecting flanges. However, the coupling is yieldable upon a certain point to tip toward the other. In the disclosed embodiment it is the connecting flange 14 which tends to tip toward the connecting flange 16 as can be seen in FIG. 4. When this tipping occurs it is at the expense of the desired increase in circumferential tensioning of the main body. Hence, when such yielding occurs, continued tightening of the nuts and bolts is ineffective to create any further substantial increase in tension of the coupling.

With the improvement of the present invention the tipping continues until abutment surfaces 26 and 28 abut each other. Once this happens the two abutment surfaces define a fulcrum about which continued tightening of the nuts and bolts is effective. Hence, the continued tightening of the nuts and bolts counteracts the tipping of connecting flanges 14 and instead imparts substantially increased contraction and circumferential tensioning of the main body. This can be seen from consideration of FIG. 5.

The interaction of abutment surfaces 26 and 28 allows the abutment surface 26 to roll or slide on abutment surface 28 as the increased tightening occurs. This rolling or sliding interaction between the two abutment surfaces promotes a substantial increase in the effectiveness of the clamping action of the main body. In this way the invention provides a significant improvement in the effectiveness of tightening a coupling joint in this type of a coupling.

The coupling 10 has the advantage of being a single unitary piece. It can be manufactured using existing fabrication techniques as a metal extrusion whereby the main body 12, connecting flanges 14 and 16, and the abutment surfaces 26 and 28 are part of the single unitary extrusion. The apertures in the connecting flanges can be drilled in the extruded piece. The extrusion may also be cut into couplings of any desired length. The coupling is extruded to a nominal shape in which the connecting flanges may be somewhat spread from that which is shown in the drawings. This allows the coupling and the pipes to be readily assembled together preparatory to tightening of the nuts and bolts. Because the coupling is a single piece, it may be economically fabricated using standard extrusion practices. Furthermore it possesses the advantage of being easy to install and put to use.

Figure 2:
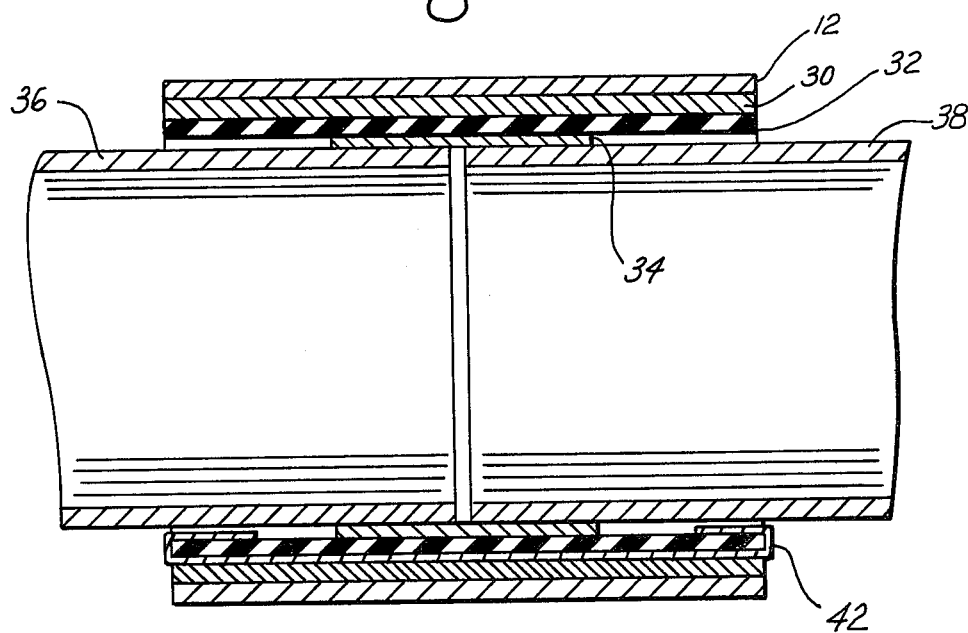
FIG. 2 is an axial sectional view through the coupling of FIG. 1 showing the coupling in use.

Although the coupling is well suited for use in many applications, it is particularly useful where a leak resistant coupling joint is specified. For this purpose the coupling may be used in conjunction with additional sleeve elements to join two pipe sections as shown in FIG. 2 in an untightened condition. These additional sleeve elements comprise a first metal sleeve element 30 disposed within the main body 12 of the coupling, an elastomeric sleeve element 32 disposed within the first metal sleeve element 30 and a second metal sleeve element 34 disposed within elastomeric sleeve element 32. The coupling joint joins two pipe sections 36 and 38. The second metal sleeve element 34 overlaps the ends of both pipes 36 and 38 as do the sleeve elements 30, 32 and the main body 12 of the coupling. It will be further observed in FIG. 2 that element 34 is located centrally of the joint with the axial ends of elements 32, 30 and the main body 12 of the pipe coupling extending axially beyond the axial ends of the second metal sleeve element 34.

When the coupling is tightened, the axial ends of the elastomeric sleeve element 32 seal against the walls of the two pipes and the metal sleeve element 34 protects the elastomeric material from any fluid in the pipes which might otherwise come in contact with the elastomeric sleeve if sleeve 34 were omitted. Because of the superior tightening action of the coupling 10, in conjunction with the sleeve elements, a leak-resistant coupling joint is attained. By way of example, the two metal sleeve elements may be of the type shown in U.S. Pat. No. 2,227,551 and having a construction consisting of a single metal band wrapped around the joint having interfitting fingers 40. The elastomeric sleeve, also by example, may be a rubber element wrapped around the joint also having interfitting fingers.

It is also desirable that the illustrated coupling joint include a grounding strip 42 disposed as shown in FIGS. 1 and 2. The grounding strip may be a flat, electrically conductive metal strip, the major portion of whose length extends the full length of the coupling joint and is disposed between the first metal sleeve element 30 and the elastomeric sleeve element 32. The ends of the grounding strip are turned over onto the ends of the elastomeric sleeve element 32 so that when the coupling is fully tightened, these bent over ends of the grounding strip are disposed between the elastomeric sleeve 32 and the respective pipes 36 and 38.

The purpose of the grounding strip is to provide electrical continuity between the pipes and all component parts of the coupling joint so as to avoid the potential build-up of static electricity anywhere along the length of the entire pipeline. While the second metal sleeve 34 will provide electrical continuity between the two pipes 36 and 38 in the event that the ends of the pipes are not in abutment, there would be, absent grounding strip 42, no assurance that the first metal sleeve 30 and the coupling 10 would be electrically coupled with the pipe sections. With the provision of the grounding strip, electrical continuity is assured because the major extent of the grounding strip is in electrical contact with first metal sleeve element 30 and the body 12 of the coupling while the turned over ends of the grounding strip are in electrical contact with the two pipe sections 36 and 38. Hence, there is electrical continuity provided between all electrically conductive component parts, so that by suitable grounding of the pipeline, the accumulation of static electricity at various component parts of the pipeline and the possibility of attendant problems occasioned thereby are avoided.

An example of coupling 10 for use with four inch pipes comprises a 0.0938 inch wall for main body 12 with one and one-half inch connecting flanges 14 and 16. The nominal I.D. (as extruded) may be 4.4 inches. The radius of the abutment surface 26 may be one-eighth inch. Obviously, other coupling sizes may be fabricated for other pipe sizes. The number of nuts and bolts will be used in a given coupling will depend upon the length of the coupling; however, normally two or three will be suitable in most instances. For example a five inch long coupling may use two.

While a preferred embodiment of the invention has been disclosed herein it will be appreciated that other embodiments are contemplated within the scope of the invention as set forth in the following claims.

What is claimed is:

1. In a pipe coupling of the type comprising a main body portion having a circumferential extent slightly less than a full 360° and circumferentially terminating in juxtaposed connecting flanges directed radially outwardly from the main body portion and tightenable fastening means operable to exert forces on the connecting flanges at a location spaced radially outwardly of the main body portion in a direction urging the connecting flanges toward each other to impart circumferential tension to the main body portion, and wherein the coupling is yieldable upon tightening of the fastening means such that at least one connecting flange tends to tip toward the other rather than to impart increased circumferential tension to the main body portion, said connecting flanges further including abutment surfaces spaced radially outwardly of the location at which the forces of the fastening means are exerted on the connecting flanges, said abutment surfaces being disposed to abut each other and thereby counteract the yielding of the coupling by providing a fulcrum about which continued tightening of said fastening means is effective to impart to the main body portion a substantial increase in circumferential tension over that existing just before abutment of the abutment surfaces, the improvement wherein the coupling comprises a unitary extruded metal element having a main body portion, rigid connecting flanges, said flanges being thicker than said main body portion, and abutment surfaces projecting from said flanges as integral portions of the extrusion and wherein one of said abutment surfaces presents, when viewed axially of the coupling, a convex shape to the opposite abutment surface, the opposite abutment surface providing a bearing surface of radial extent greater than the thickness of the main body portion coacting with the convex surface so as to allow said convex abutment surface to roll on the opposite abutment surface as the fastening means is increasingly tightened.

2. The improvement set forth in claim 1 wherein the convex shape of said one abutment surface is generally semi-circular as viewed axially of the coupling.

3. The improvement set forth in claim 1 wherein said opposite abutment surface has a planar shape as viewed axially of the coupling.

4. The improvement set forth in claim 1 including aligned apertures in said connecting flanges and wherein said fastening means passes through said apertures.

5. The improvement set forth in claim 4 wherein said fastening means comprises a nut and a headed bolt, and said coupling further includes a recess in the connecting flange containing said opposite abutment surface on the side thereof opposite said opposite abutment surface, said recess constraining the head of the bolt against rotation during tightening of the nut.

6. The improvement set forth in claim 5 wherein said one connecting flange has a flat surface on the side thereof opposite its abutment surface allowing tool access to the nut for tightening.

7. The improvement set forth in claim 5 wherein said recess comprises a slot extending axially of the coupling and having a generally rectangular shaped cross section as viewed axially of the coupling.

8. The improvement set forth in claim 1 including additional seeve elements disposed within the main body portion of the coupling.

9. The improvement set forth in claim 8 wherein said additional sleeve elements comprise a first metal sleeve element disposed within the main body portion, an elastomeric sleeve element disposed within the first metal sleeve element and a second metal sleeve element disposed within the elastomeric sleeve element, the second metal sleeve being disposed axially in a central region of the coupling and with the axial ends of the elastomeric sleeve element, the first metal sleeve element and the main body portion of the pipe coupling extending beyond both axial ends of the second metal sleeve element whereby when the coupling is installed to join two pipes the ends of the elastomeric sleeve element seal against the walls of the pipes by virtue of the clamping action of the body while the second metal sleeve element protects the elastomeric sleeve element from deleterious material passing through the coupled pipes.

10. The improvement set forth in claim 1 wherein the main body portion is circumferentially continuous having a substantially uniform thickness between the connecting flanges.

11. In a pipe coupling of the type comprising banding means for circumferentially banding aligned pipes, rigid flanges which are thicker than said banding means projecting generally radially outwardly from said banding means and tightenable fastening means operable to exert forces on the connecting flanges at a location spaced radially outwardly of said banding means in a direction urging the connecting flanges toward each other to impart circumferential tension to said banding means and wherein said connecting flanges further include abutment surfaces spaced radially outwardly of the location at which the forces of the fastening means are exerted on the connecting flanges, said abutment surfaces being disposed to abut each other and thereby counteract yielding which occurs upon increased tightening by providing a fulcrum about which continued tightening of said fastening means is effective to impart a substantial increase in circumferential tension to the banding means over that existing before abutment of the abutment surfaces, the improvement in the abutment surfaces wherein said abutment surfaces project from said connecting flanges and one of said abutment surfaces presents, when viewed axially of the coupling, a convex shape to the opposite abutment surface and the opposite abutment surface provides a bearing surface of radial extent greater than the thickness of said banding means coacting with the convex surface so as to allow the latter to roll thereon as the fastening means is increasingly tightened after the two surfaces have been placed in abutment.

* * * * *